July 20, 1926.
M. R. HANNA
SYSTEM OF CONTROL
Filed April 14, 1924
1,593,403
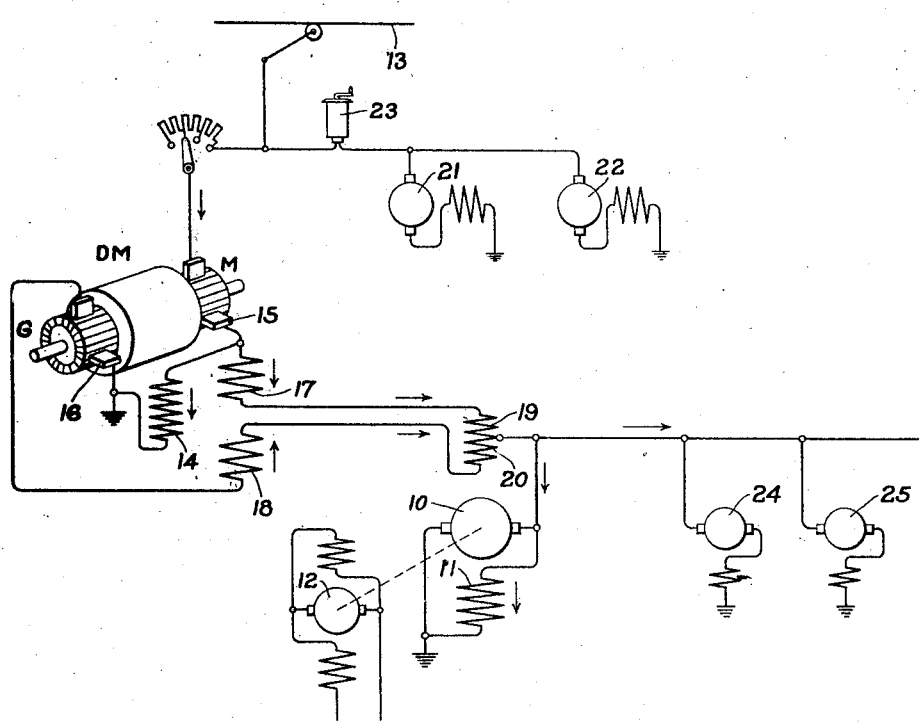
Inventor:
Max R. Hanna,
by *Alexander S. Lunt*
His Attorney.

Patented July 20, 1926.

1,593,403

UNITED STATES PATENT OFFICE.

MAX R. HANNA, OF SCOTIA, NEW YORK, ASSIGNOR TO GENERAL ELECTRIC COMPANY, A CORPORATION OF NEW YORK.

SYSTEM OF CONTROL.

Application filed April 14, 1924. Serial No. 706,233.

My invention is directed to improvements whereby a direct current motor having shunt characteristics may be safely operated in connection with a dynamotor from a source of supply subject to violent fluctuations.

One of the principal uses for the invention is in connection with electric locomotive or car equipments in which the dynamotor is used to supply a comparatively low potential to operate the motor of a motor generator set which supplies a lower potential for operating electro-magnetic controlling devices for the electrical equipment of the locomotive or car and for other purposes. In case the motor of the motor generator set is provided with a shunt field or is otherwise given a shunt characteristic, as is desirable, when the trolley is removed from the wire the motor will operate as a generator to supply current to the circuit of the driving motors and this is practically a short circuit. When the trolley is replaced, a heavy rush of current follows on account of the reduction in the speed and generated voltage of the dynamotor and the reduction in the speed and generated voltage of the motor of the motor generator set during the time the trolley is off the wire. Difficulties, such as arcing over at the commutator of the motor having shunt characteristics, are thus likely to be experienced. This rush of current and the difficulties thus experienced could be avoided by giving the motor compound characteristics, but this would be objectionable in normal operation since variations of speed with variations of load would be experienced.

One of the objects of the invention is to provide a simple and effective arrangement whereby the motor having shunt characteristics is automatically protected from the effect of surges in the potential such as have been referred to.

Although my invention is not necessarily limited thereto, it has a particularly desirable application with a dynamotor of the type disclosed in my former Patent No. 897,257, dated Aug. 25, 1908, because of the fact that the motor is further protected by reason of the protection of the dynamotor itself which the arrangements of my said patent afford.

In carrying the invention into effect in the form which I now regard as the preferred form, I provide the motor with field windings which are connected and arranged so as to have substantially no magnetizing effect during the normal operation of the dynamotor, but which become effective to protect the motor from the aforesaid effects of surges of the potential applied to the dynamotor. The said field windings are preferably series windings which normally substantially neutralize each other by reason of the fact that the current normally passes through the windings in opposite directions. When sudden variation of the supply circuit or line potential occur, the current surge will cause current to pass through the two field windings in the same direction in such a manner as to protect the motor.

For a better understanding of the invention, reference is had to the accompanying drawing which shows in simple diagram a system of control in accordance with the invention.

The motor 10 is given shunt characteristics by means of a shunt field 11 and the motor is arranged so as to drive a generator 12 which is provided for supplying a comparatively low potential current for lamps and for operating electromagnetic switches and the like. The motor 10 and the generator 12 form a motor generator set which receives energy from the comparatively high potential source of supply designated as the trolley wire 13. A potential materially lower than the potential of the trolley wire is supplied for operating the motor 10 by means of the dynamotor which is interposed between the motor and the trolley wire. This dynamotor is preferably of the type disclosed in my aforementioned Patent No. 897,257, dated Aug. 25, 1908. As shown, the dynamotor is provided with two commutators and two corresponding sets of armature windings. The end of the dynamotor which serves as a motor is designated by the letter M on the drawing and the end of the dynamotor which serves as a generator is designated by the letter G on the drawing. The dynamotor is preferably provided with a shunt field 14 which is preferably connected between the lower potential brush 15 at the motor end of the dynamotor and the lowest potential brush 16 at the generator end of the dynamotor. The field structure of the dynamotor is not shown, since this is not of the essence of the invention and for the further reason that those skilled in the art will readily understand the requirements for a suitable field structure by reference to my aforesaid patent. The dynamotor is provided with two series field windings 17 and 18, which are connected in such a manner that the fluxes set up by these field windings normally oppose each other, and the arrangement is such that in case of abnormal conditions, these fluxes will assist each other and thereby protect the dynamotor from the effects of violent fluctuations in the potential supplied to the dynamotor.

The motor 10 is provided with two series field windings 19 and 20, which form a connection between the lower potential ends of the series field windings 17 and 18 of the dynamotor. The connections of the series field windings 19 and 20 are such that the fluxes set up thereby oppose each other in the normal operation of the motor 10, but these fluxes assist each other to protect the motor in case of abnormal conditions, such as heretofore set forth. A connection to the armature of the motor 10 is made from a junction of the lower potential ends of the series field windings 19 and 20.

The traction motors 21 and 22 are indicated in very diagrammatic form and are indicated as being connected to the trolley through the controller 23. It will be understood by those skilled in the art that this diagrammatic representation of the connection of the traction motors to the trolley is made in order to obtain a clear understanding of the invention without showing a comparatively complicated system of control for the traction motors. It will also be understood that ordinarily the traction motors will be controlled through the operation of a master controller and electroresponsive switch mechanism, but since such arrangements are not of the essence of the invention, this feature has been omitted and the very diagrammatic representation has been adopted. It will also be observed that I have shown the motors 24 and 25 as being supplied with current from the trolley wire through the dynamotor. These motors are indicated as of the series type and on a locomotive, these motors would be used for operating blowers and the like, as will be understood by those skilled in the art.

The operation of my invention as thus constructed and arranged is as follows:

Let it be assumed that the dynamotor is receiving energy from the trolley and transforming the high potential of the trolley circuit to a materially lower potential for the load circuit represented by the motors 10, 24 and 25. The direction of current through the various field windings will be as represented by the arrows. It will be seen that the direction of the current through the series field windings 17 and 18 of the dynamotor is such that the fluxes set up by these field windings will oppose each other during the normal operation and it will also be observed that the direction of the current through the series field windings 19 and 20 of the motor 10 will be such that the fluxes of these field windings will oppose each other. Thus, the dynamotor and the motor 10 will each have shunt characteristics during the normal operation of the arrangement.

Let it be assumed that the trolley leaves the trolley wire 13 while the dynamotor and the motor 10 are operating. When this happens the dynamotor and the motor 10 will momentarily operate as generators and deliver current through a comparatively low resistance circuit through the traction motors 21, 22, etc. When this happens the direction of the current through the series field winding 17 of the dynamotor and the direction of the current through the series field winding 19 of the motor 10 will be reversed so that the fluxes of the series fields 17 and 18 of the dynamotor will assist each other and will be in opposition to the flux set up by the shunt field 14 of the dynamotor. It will also be observed that the fluxes set up by the series fields 19 and 20 of the motor 10 will assist each other and that the combined flux thus set up will be in opposition to the flux set up by the shunt field 11. This will effect a very quick reduction in the voltage generated by the dynamotor and the motor 10. In fact, the arrangement may be such that the effective flux of the dynamotor and the effective flux of the motor 10 will be "killed" in such a very short time that the dangers due to arcing over at the commutators on the dynamotor and the motor will be obviated. If the trolley is kept off the trolley wire for an interval of time during which the speed of the dynamotor and the speed of the motor 10 have materially decreased, when the trolley is again put in contact with the trolley wire 13, there will be a momentary rush of current. When this happens the current will pass from the trolley wire through the dynamotor and through the motor 10, but it will be observed that the direction of the current through the series field windings 17 and 18 of the dynamotor will be reversed. In other words, the direction of the current through the field winding 17 will be as shown by the arrow and the direction of the current through the field winding 18 will be in the opposite direction to that indicated by the arrow. Likewise the direction of the current through the series fields 19 and 20 of the motor will be reversed. Thus, the direction of the current through the series field 19 will be in the direction indicated by the arrow and that through the series field 20 will be in the direction opposite to that indicated by the arrow. These series fields have a certain inductive effect which acts to materially limit the initial rush of current so as to thus protect the dynamotor and the motor from flash overs at their commutators. It will be noted that the direction of the current through the series field windings of the dynamotor and through the series field windings of the motor will cause fluxes to be set up which assist the shunt field 14 of the dynamotor and the shunt field 11 of the motor respectively. This will operate to inherently protect the dynamotor and the motor, and when the speeds at the dynamotor and the motor have increased the direction of the current through the series fields of these machines will be as indicated by the arrows.

It will be observed that by establishing the field windings 19 and 20 of the motor 10 as a connection between the series field windings 17 and 18 of the dynamotor, a very simple and effective arrangement is provided for carrying into effect the objects of the invention.

While I have explained the operation of the invention during two extreme conditions which are likely to be experienced, it will be understood from the foregoing that violent variations of the voltage of the trolley wire are similarly inherently compensated for in the dynamotor and the motor, so that these machines are inherently protected both when the trolley wire voltage increases materially and when this voltage is decreased materially during the normal operation of the equipment.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. The combination with a dynamotor for transforming direct current from one voltage to another, of a load for the dynamotor comprising a direct current motor having a shunt field, and other field windings for said motor connected and arranged to have substantially no magnetizing effect on the motor in the normal operation of the dynamotor and the motor, but to become effective to produce a magnetizing effect which controls the effect of the said shunt field winding to protect the motor from the effects of surges of the potential applied to the dynamotor.

2. The combination with a direct current dynamotor, for transforming direct current from one voltage to another, of a load for the dynamotor comprising a direct current motor having a shunt field winding and two series field windings, and connections between the said dynamotor and the said series field windings whereby the series fields oppose each other while the voltage of the source of supply is substantially constant and assist each other to supplement or oppose the effect of the flux of the said shunt field to protect the motor when the voltage of the source of supply fluctuates depending on the direction of the fluctuation.

3. The combination with a direct current dynamotor having two armature windings provided with commutators and adapted to be connected respectively in the supply and load circuits, the said dynamotor having a shunt field winding and two series windings in series with the said two armature windings respectively and arranged to oppose each other in the normal operation of the dynamotor, of a load for said dynamotor comprising a direct current motor having a shunt field winding and two series field windings which normally oppose each other, the said motor series field windings being respectively connected in series relation with the said opposing series field windings of said dynamotor.

4. The combination with a direct current dynamotor having two armature windings provided with commutators and adapted to be connected in the supply and load circuits for transforming direct current from one voltage to another, of a load for the dynamotor comprising a direct current motor having a shunt field winding and two series field windings, the first of said series field windings, being connected to receive energy from the supply circuit through one of said commutators, and the second series field winding being connected in the load circuit of the dynamotor to receive energy from the other commutator of the dynamotor and normally produce a magnetomotive force in opposition to the magnetomotive force of the said first series field winding, and a connection from a junction of the lower potential ends of said series field windings to the armature of said motor.

5. The combination with a direct current dynamotor having two armature windings provided with commutators and adapted to be connected respectively in the supply and load circuits, the said dynamotor having a shunt field winding and two series field windings in series with the said two armature windings respectively and arranged to oppose each other in the normal operation of the dynamotor, of a load for the dynamotor comprising a direct current motor having a shunt field winding and two series field windings, the said motor series field windings forming a connection between the said dynamotor series field windings and arranged to oppose each other during normal operation and to assist each other and control the effect of the motor shunt field winding to protect the motor from the effects of surges of the potential applied to the dynamotor.

In witness whereof I have hereunto set my hand this 12th day of April, 1924.

MAX R. HANNA.